United States Patent [19]

Kohashi

[11] Patent Number: 4,479,135

[45] Date of Patent: * Oct. 23, 1984

[54] INK RECORDING APPARATUS

[75] Inventor: Tadao Kohashi, Moriguchi, Japan

[73] Assignee: Matsushita Electric Industrial Co., Ltd., Kadoma, Japan

[*] Notice: The portion of the term of this patent subsequent to Aug. 2, 2000 has been disclaimed.

[21] Appl. No.: 390,967

[22] Filed: Jun. 22, 1982

[30] Foreign Application Priority Data

Jul. 2, 1981 [JP] Japan .................. 56-104175

[51] Int. Cl.³ .................................. G01D 15/18
[52] U.S. Cl. .................................. 346/140 R
[58] Field of Search ............ 346/140, 140 R; 101/1, 101/DIG. 13

[56] References Cited

U.S. PATENT DOCUMENTS 4,271,416 6/1981 Shimizu et al. .............. 346/140 R
4,396,925 8/1983 Kohashi .................. 346/140 R Primary Examiner—E. A. Goldberg
Assistant Examiner—Gerald E. Preston
Attorney, Agent, or Firm—Cushman, Darby & Cushman

[57] ABSTRACT

In a head of an electroosmotic ink recording apparatus wherein a porous substance film 40 and a second electrode 50 which is permeable to a fluid ink 200 are accumulated in sequence on a principal face 11 of a non-porous substrate 10, on which a plural number of first electrodes (recording electrodes) 20 are provided, signal voltages $V_B$ and $V_B'$ for ink recording being applied between the first electrodes 20 and the second electrode 50, the first electrodes are of ink-philic (generally hydrophilic) conductive substance and their surfaces are isolated with a substantially ink-repellant (generally hydrophobic) and insulative substance, thereby recording has a clear discretion between neighboring dots drawn by corresponding neighboring second electrodes.

8 Claims, 4 Drawing Figures

INK RECORDING APPARATUS

BACKGROUND OF THE INVENTION

1. Field of the Technology of the Invention

The present invention relates to an improvement in an ink recording apparatus which utilizes an electroosmotic phenomenon of a fluid ink.

2. Description of the Prior Art

The present inventor has already proposed an ink recording apparatus wherein a porous substance body which has two-dimensional spread is installed on a supporting substrate having a plural number of first electrodes insulated from each other, corresponding to the recording density, and a second electrode permeable to the fluid ink is located on this porous substance body at the surface that is opposite to the surface contacting the first electrodes, and the fluid ink is fed and impregnated into the above-mentioned porous substance body, and also signal voltages are applied between the above-mentioned first and second electrodes, thereby the above-mentioned fluid ink makes an electroosmotic travelling through the above-mentioned porous substance body to form a recording fluid ink part which is controlled corresponding to the above-mentioned signal voltages on a tip part of the above-mentioned first electrode, and also proposed an ink recording apparatus wherein this recording head is employed, thereby a recording medium is brought in contact with the tip part thereof to directly transfer the fluid ink or the fluid ink is flied and deposited onto the recording medium by means of electroosmosis or by Coulomb force due to a high electric field.

Here, the "Electroosmosis" is a general designation of the interfacial electrokinetic phenomena that, when a liquid substance is brought in contact with a solid substance, electric double layers are formed at their boundary surface, and when an electric field having a component parallel to this boundary surface is applied, the liquid substance moves in relation to the solid substance. The "Fluid ink" is a general description of a fluid with which recording is made on a recording media such as a recording sheet, and the fluid may or may not have color. For instance, it may be a transparent magnetic ink. Of course, it includes ordinary inks for use in ink-recording which contains coloring substance such as a dye and/or a pigment.

Conventionally, the above-mentioned ink recording head is operated in such a manner that the electroosmotic polarity of the fluid ink on the surface of the dielectric substance forming the surface of the supporting substrate and the electroosmotic polarity of the porous substance body are selected at the same polarity, and that signal of the ON voltage for making ink recording has the polarity by which the fluid ink makes an electroosmotic travelling from the second electrode side to the first electrode side through the porous substance body, and that the signal of the OFF voltage is of reverse polarity to the ON voltage and makes an electroosmotic travelling in the reverse direction to prevent an ink recording.

Then, as a result of the above-mentioned construction, on the part where the ON voltage is applied, the fluid ink is pushed out to the tip part side of the first electrode by an electroosmotic pressure, while on the part where the OFF voltage is applied, the fluid ink remaining on the tip part of the first electrode is sucked up toward the second electrode side through the porous substance body. In addition, on the tip part side of the first electrode, the fluid ink remaining on the part where the OFF voltage is applied makes an electroosmotic travelling to the part where the ON voltage is applied through the surface of the supporting substrate. Accordingly, on the tip part of the first electrode whereto the ON voltage is applied, an ink-converging action due to the adjacent OFF voltage and an ink-feed pumping action through the porous substance body are exerted, while on the tip part of the first electrode whereto the OFF voltage is applied, a suck-up effect toward the adjacent first electrode side whereto the ON voltage is applied and toward the second electrode side through the porous substance body is exerted.

Therefore, on the tip part of the first electrode whereto the ON voltage is applied, a high density of recording fluid ink part to be transferred or fly-deposited corresponding to the amplitude of the voltage thereof is formed, while on the part whereto the OFF voltage is applied, the recording fluid ink part disappears, thus the recording fluid ink part which is controlled corresponding to the signal voltage is formed.

Thus, the conventional ink recording head has an advantage that by selecting the ON voltage and the OFF voltage at suitable values respectively, a simple ink recording apparatus of high performance unlike the one of the conventional system can be constituted.

However, a problem was found that where the switching frequency of the signal voltage is high, where the gap between the first electrodes is wide and the recording density is low, or where the electroosmotic property of the surface of the supporting substrate is poor in comparison with that of the porous substance body, it is difficult to completely extinguish the remaining ink part on the gap at the tip part of the first electrode whereto the OFF voltage is applied, and because of transfer or fly-deposition of such fluid ink onto the recording medium, the resolution is remarkably reduced, resulting in a deterioration of an ink-recorded picture.

SUMMARY OF THE INVENTION

The present invention purposes to provide an ink recording head wherein deficiencies thereof are improved on the background of the above-mentioned difficulties in performance.

More concretely, the present invention is that in the above-mentioned ink recording head, the above-mentioned first electrode part is constituted so as to wet well with the fluid ink to be used, that is, to have an ink-philic property, and that, of the above-mentioned surface of the supporting substrate, at least the surface parts of the supporting substrate located between the first electrodes of the above-mentioned tip part side of the first electrodes are constituted so as to substantially repel or become difficult to wet with the above-mentioned fluid ink, that is, to have an ink-repellent property.

DESCRIPTION OF PREFERRED EMBODIMENTS

Figure 1:
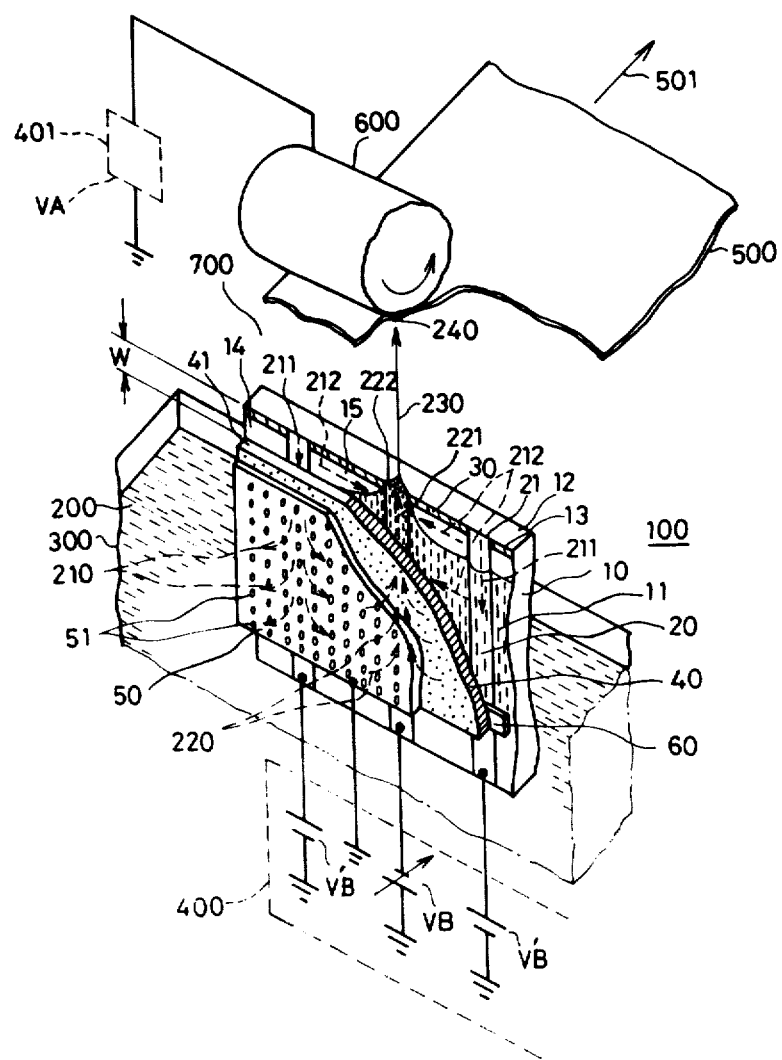
FIG. 1 is a fragmental perspective view showing one embodiment of a principal part of an ink recording apparatus in accordance with the present invention and a power supplying system wherein an auxiliary electrode 600 is drawn removed upwards for easier illustration.

FIG. 1 is a fragmental perspective view showing one embodiment of an ink recording apparatus in accordance with the present invention and a power supplying system. In the view, numeral 100 is an ink recording head, and 200 is a fluid ink which is accommodated in an ink tank 300 wherein the ink recording head 100 is partly immersed, and the fluid ink is fed and impregnated into the ink recording head 100. Numeral 400 is a signal voltage source, numeral 500 is a recording sheet such as paper or the like, which is a recording medium, and numeral 600 is a roller-shaped auxiliary electrode which feeds the recording medium 500 in the direction as shown by an arrow 501 in the view, and also applies an auxiliary voltage $V_A$ from an auxiliary voltage source 401. In the view, the auxiliary electrode 600 is shown as removed upward from its location in place for easy illustration. Furthermore, the auxiliary electrode 600 may be fixed without being rotated or may be installed on an insulator in a limited fashion while facing tip parts 21 of first electrodes 20. Numeral 10 is a sheet-shaped non-porous dielectric substrate such as borosilicate glass, cellulose acetate, or the like. On a surface 11 of the dielectric substrate, the first electrodes 20, which are recording electrodes, are arranged corresponding to the predetermined ink recording line pitch, for instance, at a pitch of 3 to 8 lines per mm, and the width of the first electrode is 50 to 200 μm corresponding to the above-mentioned recording density.

The first electrodes 20 are coated extremely thinly; as about 500 to 2000 Å with a tin oxide conductive film or metal evaporation film, or the like. As the first electrode 20, an ink-philic conductive material, which gets wet well with the fluid ink 200 in order to obtain a stable flying ink recording, is used.

On an exposed end edge surface 14, which is located on the tip part 21 of the first electrode 20 and is in contact with a side end edge surface 12 of the supporting substrate 10 at an end edge 13, gaps 15 between the first electrodes 20 are constituted such parts as not to wet with the fluid ink 200. That is, the parts exclusively of the first electrodes, each having the width of, for instance, 20 to 100 μm, are constituted so as to have an ink-repellent property. The effective method of this construction is to coat an ink-repellent agent 30 having a surface tension smaller than that of the fluid ink 300 to be used (normally about 20 dyne/cm or more) on the exposed end edge surface 14.

For the ink-repellent agent 30, a substance of high inherent resistance, preferably of insulating property is selected so as not to break down by the signal voltages applied between the first electrodes 20.

For the ink-repellent agent 30 meeting the above-mentioned conditions, for instance, an oil-repellent, water repellent, anti-outflow coating agent of insulating property wherein one of fluoric compound polymers dissolved in a fluoric compound solvent (for instance, FLUORAD FC-721; trade name of SUMITOMO 3M Co. Japan, or the like) is used. The surface tensions of these are as extremely low as 11 dynes/cm. By coating this sort of ink-repellent agent 30 by about 1 μm in thickness, an ink-repellent property is given to the end edge 13 of the exposed end edge surface 14.

On the surface 11 of the substrate 10, a porous substance body 40 is installed which has pores or gaps penetrating substantially in the direction of thickness and wherethrough the fluid ink 200 can osmose in the direction of thickness. For the porous substance body 40, a microporous membrane filter comprising cellulose acetate of, for instance, 20–200 μm in thickness, 0.1 to 8 μm in mean pore diameter, and 60 to 80% in porosity is employed. For the porous substance body 40, other plastic materials, glasses, ceramic materials can be also employed.

It is desirable to form the exposed end edge surface 14 on the surface 11 of the substrate 10, by locating an end edge 41 of the porous substance body 40 to set back from the end edge 13 of the substrate 10, for instance, by about 50 to 300 μm. By forming the end edge surface 14, an electrical converging action of the fluid ink utilizing an electroosmotic property of the fluid ink 200 on this surface 14 can be utilized; thereby this method is useful for the recording of high resolution.

On a surface of the porous substance body 40 opposite to the surface contacting the substrate 10, a second electrode 50 is disposed in a manner to press the porous substance body 40. The second electrode 50 is made of a stainless steel sheet of about 50 to 300 μm in thickness provided with fine through holes 51 disposed at a density of, for instance, 100 to 300 mesh per inch in order to be permeable to the fluid ink 200. Alternatively, the second electrode 50 may be made of a metallic mesh or the like.

Furthermore, the second electrode 50 may be constituted by thinly coating a conductive paint such as graphite or the like on the surface of the porous substance body 40.

The end part of the porous substance body 40 opposite to the end where is close to the recording medium is sealed to the surface 11 of the substrate 10 and the surface of the first electrode with a sealing agent 60 such as an adhesive or the like to prevent a backflow of the fluid ink due to the electroosmosis as described later.

The fluid ink 200 is fed and impregnated into the porous substance body 40 through pores of the second electrode 50.

As the fluid ink 200, either of water ink or solvent ink having a specific electric resistance of $10^3$ Ω cm or more can be used. In order to prevent breakdown of insulation and obtain good electroosmotic property, use of a solvent ink having viscosity of under 10 cm-Stokes, surface tension of 40–50 dyne/cm and specific resistance of over $10^7$ Ω cm is preferable.

As the fluid ink 200 which shows a good electroosmotic property with respect to the above-mentioned porous substance body 40 and the substrate 10, the solvent ink 200 is constituted in such a manner that, for instance, an oil-soluble dye such as azo dye is mixed into a liqueous substance comprising, for instance, γ-methacryloxy-propyl-trimethoxysilane by a weight ratio of about 2 to 5% together with a vehicle agent, charge controlling agent, surface-active agent or the like when required.

This sort of ink makes an electroosmotic travelling toward the negative electrode with respect to the porous substance body 40 and the substrate 10.

The speed of this electroosmotic travelling is increased with increasing the applied signal voltage, and the maximum amplitude thereof is set so that the electric field intensity is about 2 V/$\mu$m in view of breakdown.

The first electrodes 20 which are recording electrodes are connected respectively to the signal voltage source 400, and signal voltages $V_B$ and $V_B'$ are applied selectively between them and the second electrode 50.

Now, operation is elucidated in reference to an example where the OFF voltage $V_B'$ that the second electrode 50 is negative with respect to the first electrode 20 and the ON voltage $V_B$ that the electrode 20 is conversely negative with respect to the electrode 50 are applied in an alternating fashion as signal voltages show in FIG. 7.

On the parts whereto $V_B'$ is applied, the fluid ink 200 makes an electroosmotic travelling from the first electrode 20 forming a positive electrode to the second electrode 50 forming a negative electrode through the porous substance body 40 as shown by arrows 210, and also the fluid ink 200 located near the electrode tip part 21 is sucked up toward the second electrode 50 as shown by arrows 211.

Furthermore, since the substrate 10 is constituted also so as to have the same electroosmotic property as that of the porous substance body 40, the fluid ink 200 makes an electroosmotic travelling on the surface 11 of the substrate 10 from the electrodes 20 whereto the positive voltage $V_B'$ is applied toward the adjacent electrodes forming negative electrodes with the negative voltage $V_B$ applied, as shown by arrows 212.

Accordingly, the fluid ink 200 is not present in the vicinity of the tip part 21 of the first electrode 20 whereto $V_B'$ is applied and on its surrounding exposed end edge surface 14.

On the other hand, on the first electrode 20 part whereto $V_B$ is applied, the fluid ink 200 penetrates the second electrode 50 and makes an electroosmotic travelling through the porous substance body 40 as shown by arrows 220, and then concentrates toward the surface of the first electrode 20. Since the end part opposite to the end edge 13 is sealed with the sealing agent 60, the fluid ink 200 is pushed out toward the tip part 21 along the surface of the first electrodes 20 by an electroosmotic pressure as shown by an arrow 221. Thereby a fluid ink part 222, which is position-controlled corresponding to the electrodes 20 and ink-amount-controlled with respect to the amplitude of $V_B$, is formed on the exposed end edge surface 14.

In addition, the fluid ink 200 makes an electroosmotic travelling as shown by the above-mentioned arrows 212 also from the adjacent positive electrodes 20 through the surface 11 of the substrate 10 and the exposed end edge surface 14, and gathers on the surface of the negative-impressed electrode 20. By a "pushing-out and converging" effect thus obtained, formation of the fluid ink part 222 is performed more effectively.

In order to effectively utilize the sucking-up, pushing-out and converging effects of the fluid ink 200 as based on the present principle, it is desirable to keep the end edges 41 and 13 parallel to each other to hold the distance between the end edges 41 and 13 constant. When the width W of this distance, namely, of the exposed end edge surface 14 is narrow in excess, the converging effect of the fluid ink 200 on the surface 14 is reduced, resulting in a deterioration in the resolution of recording. On the contrary, when the width W is wide in excess, the ink 200 to be sucked up on the tip part 21 when $V_B'$ is applied remains without being fully sucked up, resulting in a deterioration of quality of the recorded picture. From the reason as mentioned above, the width W is normally selected at about 50 to 300 $\mu$m as mentioned above. Furthermore, in the present embodiment, the recording head 100 is held vertical, and when the width W of the above-mentioned exposed end edge surface 14 is wide, formation of the fluid ink part 222 by means of pushing-out sometimes cannot be sufficient because a backflow due to the gravity takes place. In such case, the ink recording head 100 is successfully used by holding it horizontal or by further tilting it to hold aslant in a manner that the tip part 21 will be located downward a little.

When a recording paper of about 80 $\mu$m in thickness is used as the recording medium 500, a gap 700 between the electrode tip part 21 and the auxiliary electrode 600 is selected at, for instance, 200 $\mu$m, the maximum amplitudes of $V_B$ and $V_B'$ are selected at about 150 V respectively, and the DC high voltage $V_A$ of the auxiliary power source 401 is selected at an appropriate value, for instance, $-1.7$ KV, so that an ink-fly 230 will take place by means of Coulomb force. That is, at a presence of the fluid ink part 222 at the electrode tip part 21 whereto $V_B$ is applied an ink protrusion is produced by means of Coulomb force of $V_A$ toward the gap 700 on the fluid ink part 222 of the electrode tip part 21, and the ink-fly 230 takes place from the tip part to produce an ink deposit 240 on the surface of the recording medium 500. On the other hand, the fluid ink part 222 cannot exist on the electrode tip part 21 whereto $V_B'$ is applied. Therefore the ink deposit 240 cannot be produced in this case. Thus, unlike the conventional ink recording apparatus, by means of Coulomb force the amount of ink on the electrode tip part 21 is modulation-controlled by the signal voltages $V_B$ and $V_B'$ of low voltage. Accordingly, modulation for ink-fly-amount modulation of the auxiliary voltage $V_A$ in response to the flying signal modulation can be dispensed with. Therefore a simple ink recording apparatus of far lower voltage can be realized. Normally, for an appropriate $V_A$, for instance, DC voltage of about 1.5 KV to 2.0 KV of the same polarity as that of the voltage $V_B$ is employed. The voltage of $V_B'$ is selected to be constant amplitude, and the voltage $V_B$ may be amplitude-modulated, pulse-width-modulated, or pulse-width-amplitude-modulated responding to concentration of picture elements of the ink recording.

Hitherto, in the conventional ink recording head, when the switching frequency of the signal voltage $V_B$ and $V_B'$ is high, or when the recording width of the gap 15 between electrodes, or when the electroosmotic property of the surface 11 of the substrate 10 is poor in comparison with that of the porous substance body 40 or the like, it becomes difficult to completely extinguish the remaining ink part on the surface of the electrode gap part 15 on the exposed end edge surface 14 when the OFF voltage $V_B'$ is applied. Accordingly, undesirable residual ink is transferred or fly-deposited onto the recording medium 500. In such conventional apparatus, on the part where the ON voltage $V_B$ is applied adjoining to the part where $V_B'$ is applied, the ink cannot fully gather on the electrode tip part 21 due to an insufficient converging action, thereby the recording fluid ink part 222 spreads up to the electrode gap part 15, resulting in an excessively large recording dot. Furthermore, when the ON voltage $V_B$ is applied to the electrodes adjoining to each other, no converging action can be exerted. Thereby there has been the problem that the fluid ink 200 has existed also on the electrode gap part 15 and the recording fluid ink part 222 has been formed undesirably like a line along the end edge 13. Consequently, the ink has been deposited in excess on the recording paper 500 and the recording has been made continuous in horizontal direction, thereby a dot-pattern recording is difficult to be made. Thus, the conventional ink recording head had the disadvantage that the resolution of recording and the quality of recorded picture are poor.

In the embodiment in FIG. 1, the feature is that the ink-repellent agent 30 is coated on the electrode gap part 15 located at the end edge part 13, so that the recording fluid ink 222 cannot exist on that part because of an ink-repelling action. Accordingly, the remaining ink to cause an unnecessary ink recording is expelled from this part. Furthermore, on the end edge 13 when $V_B$ is applied, the recording fluid ink part 222 is formed limitedly on the first electrode 20 which is of ink-philic property, thereby a dot-shaped ink recording can be made corresponding to the shape of the cross-section of the electrode tip part 21 even if $V_B$ is applied to the electrodes adjoining to each other. Furthermore, because an unnecessary ink recording due to the remaining ink can be prevented by means of this ink-repellent agent 30, an advantage is obtainable that the resolution of ink recording and the quality of recorded picture are outstandingly improved.

Furthermore, in the above-mentioned embodiment, the ink-repellent agent 30 has been coated limitedly on the end edge 21 side, however, the ink-repellent agent 30 can be coated selectively on the entire surface of the electrode gap 15 in the exposed end edge surface 14, and further on the surface of the electrode gap 15 over the entire range of the surface 11 of the substrate 10.

Furthermore, in the above-mentioned examples, when the electrode gap 15 becomes narrower, the ink-repellent agent is sometimes difficult to be selectively coated limitedly on this gap 15.

In such case, the ink-repellent agent 30 is preliminarily coated evenly on a desired position on the supporting substrate 11, including the part where the first electrodes 20 are installed, and thereafter an ink-philic metallic film such as gold, copper or the like is selectively deposited by evaporation through an evaporation mask. Or other method may that after evenly depositing the above-mentioned metal film by evaporation, an etching such as photo-etching or the like is applied selectively, thereby the desired first electrodes 20 can be formed. Configuration of the electrodes 20 by means of coating a conductive paint is difficult because of the repellent property of the coated ink repellent agent. Therefore the above-mentioned manufacturing method can be recommended.

Furthermore, the first electrode 20 can be constituted in such a manner that a dent part such as a groove having the width and depth of about 20 to 70 μm or the like is formed on the surface 11 of the substrate 10 by means of etching or machine work, and an ink-philic silver paint or the like is deposited on the bottom and further on the side walls of this dent part. Or instead, a fine metal wire of ink-philic property such as copper wire or the like may be disposed in this dent part. Particularly, in the case where a fine metal wire is utilized, the flying recording by means of Coulomb force can be made easily by protruding the electrode tip part 21 from the end edge 13 by about 10 to 100 μm into the flying gap 700.

In either of the above-mentioned cases, substantially ink-philic configuration is obtainable also by coating the ink-repellent agent 30 on the electrode gap parts forming the surface 11 excluding the dent parts so as to include at least the end edge 13 like the above-described case.

Sometimes, the recording fluid ink 222 spreads up to the side end edge surface 12 from the electrode tip part 21 to be deposited and remain, resulting in a deterioration of the quality of recorded picture. For preventing this phenomenon, it is effective to constitute the side end edge surface 12 so as to have an ink-repellent property substantially by coating the ink-repellent agent on a partial or entire surface of the side end edge surface 12 so as to include at least the end edge 13, or the like. Such configuration can be applied likewise to the embodiments as described later, not limited to the present embodiment.

Figure 2:
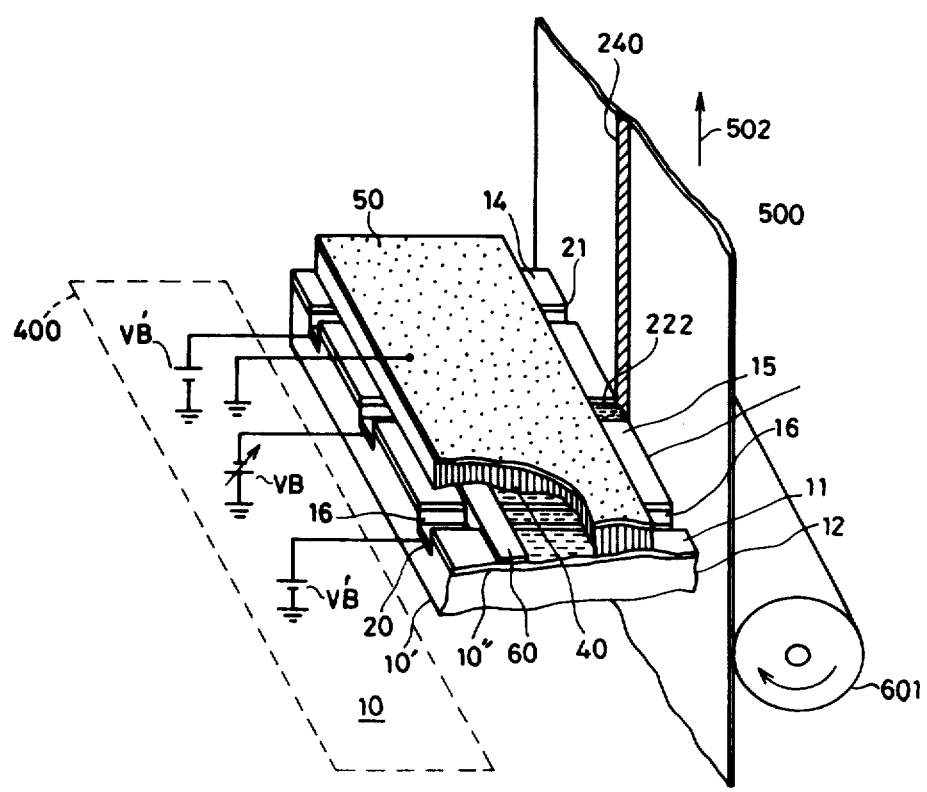
FIG. 2 is a fragmental perspective view showing another embodiment of a principal part of an ink recording apparatus in accordance with the present invention and a power supplying system.

FIG. 2 is a fragmental perspective view showing a second embodiment of an ink recording apparatus in accordance with the present invention and a power supplying system.

Furthermore, in the embodiments of FIG. 2 and subsequent figures for explanatory convenience sake, the parts and components corresponding to those in FIG. 1 are designated by the corresponding number to those in FIG. 1.

This embodiment in FIG. 2 is useful in the case where, as shown in the view, the recording paper 500 is pressure-contacted with the end edge 13 of the substrate 10 by means of a pressure-contact roller 601. In the embodiment of FIG. 2, the recording fluid ink part 222 produced on the electrode tip part 21 is transferred by contact to the recording paper 500, and then the recording paper 500 is moved in the direction as shown by an arrow 502, thereby an ink recording by means of the deposited ink 240 is carried out.

The substrate 10 is constituted with an accumulated body of plural kinds of materials. That is, an ink-repellent layer 10″, for instance, an ethylene fluoride polymer film of about 10 to 30 μm in thickness, such as instance, Teflon, Duracon, or the like (Trade marks) or the like, is coated on the porous substance body 40 side of a layer-shaped auxiliary substrate 10′ of preferably ink-philic property, such as glass, ceramics, plastic plate, or the like.

Dent grooves 16 of about 20 to 70 μm in width and depth are formed on the surface 11 of this substrate at an interval corresponding to the recording picture element density, and a silver paint or the like is coated on the bottom part thereof, thus the ink-philic first electrodes 20 are formed as shown in FIG. 2.

Furthermore, to obtain a firm adhesion of the electrodes 20, it is desirable that the dent groove 16 at least reaches the supporting body 10′ by penetrating the ink-philic layer 10″ and the electrodes 20 is adhered to the material of the supporting body 10′.

Furthermore, in this embodiment, the second electrode 50 is constituted so as to be permeable to the fluid ink by coating a sputtered film such as silver, graphite or the like, paint film, or the like in a thin and porous fashion on the porous substance body 40, thus the same configuration as in FIG. 1 can be applied. Furthermore, for explanatory convenience sake, an illustration of the fluid ink feeding means to the porous substance body 40 is omitted.

In this system, the electroosmotic property of the surface 11 of the substrate 10 is not utilized and formation and extinction of the recording fluid ink part 222 on the electrode tip part 21 is performed by electroosmotic pushing-out and sucking-up actions to the porous substance body 40 through the dent grooves 16.

On the electrode gap part 15, no fluid ink can exist due to an ink repelling action of the ink-repellent layer 10", thereby a clear and crisp ink recording of high resolution can be made. Furthermore, this head does not require the Coulomb force flying voltage $V_A$ as shown in the embodiment of FIG. 1, therefore an ink recording apparatus of low voltage drive can be realized. Besides, in FIG. 3, the entire substrate 10 may be made of the ink-repellent material 10", having the dent groove 16 thereon.

Figure 3:
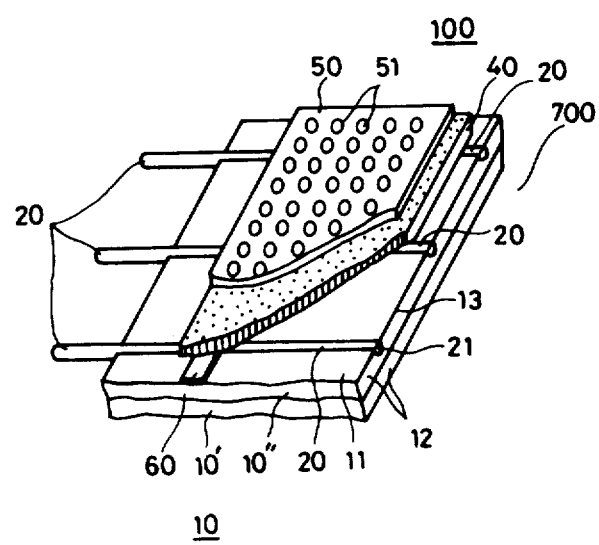
FIG. 3 is a perspective view of fragmental structure of still another embodiment of an ink recording head in accordance with the present invention.

FIG. 3 is a fragmental perspective view of a structure of still another embodiment of an ink recording head embodying the present invention.

In the embodiment of FIG. 3, the substrate 10 is constituted in such a manner that the ink-repellent layer 10", such as an ethylene fluoride polymer film or the like, is coated on the auxiliary supporting plate 10'. And in this layer 10", the first electrodes 20 comprising fine ink-philic metal wires, such as copper or the like, of about 20 to 50 μm in diameter are embedded with a pitch of about 3 to 8 wires per mm being partly exposed to the surface 11. Fine metal wires 20 of circular cross-section are preferable, and the upper surface thereof may protrude partly above the plane of surface 11 of the substrate 10. But, more preferable mode of embodiment is that the surface of the ink-repellent layer 10" and the protruding wire undergo surface grinding together for necessary parts thereof, to form a flush surface 11 of the substrate 10. Thereby the ground upper surfaces of the metal wires are disposed flush with the surface 11 as shown in FIG. 3.

Furthermore, the electrode tip part 21 may protrude from the front end edge 13 toward the flying gap 700, preferably by the length of 100 μm or less. Also the ink-repellent layer 10" provided with the electrodes 20 may protruded from the auxiliary plate 10' toward the gap 700, thereby a terrace can be provided on the front end edge surface 12.

Figure 4:
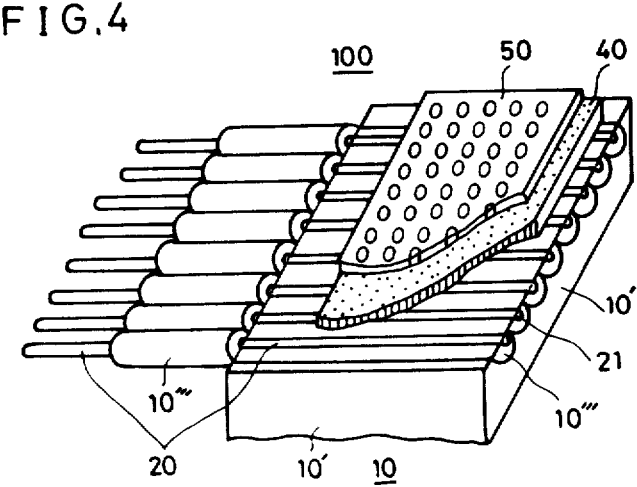
FIG. 4 is a perspective view of fragmental structure of still another embodiment of an ink recording head in accordance with the present invention.

FIG. 4 is a fragmental perspective view of structure of still another example of an ink recording head embodying the present invention.

In this embodiment of FIG. 4, the first electrodes 20 comprising ink-philic metal wires are covered with an ink-repellent coating or sheath 10''' made of such as ethylene fluoride polymers or the like. This coating is formed connected to each other to form a belt-like thing, and the arrangement pitch of the electrodes 20 determines the recording pitch. This belt-shaped thing is adhered onto the auxiliary supporting plate 10' with an adhesive or the like (not shown in FIG. 4), the surface to contact the porous substance body 40 is ground into a plane in order to make a good contact. The upper surface of the electrodes 20 are partly exposed from the coating 10''' and the tip part thereof is exposed with semicircular cross-section.

Embodiments of FIGS. 3 and 4 have such advantages that because metal wires of good conductivity are used as the first electrodes 20, the electrodes are made to have good conductivity; that because particularly in FIG. 4 the fine metal wire electrodes 20 arranged with narrow pitch is used, the pitch of recording picture element can be made very fine; and that because the first electrodes are made with insulator-sheathed wires, leading out of the first electrode 20 is easy, thereby a stable power supplying operation is obtainable.

In case of using metal wires as the first electrodes 20 as shown in FIG. 3 and in FIG. 4, it is preferable to form grooves along such faces of the metal wires that contact the porous substance sheet 40, by for example chemical etching, in a manner that the grooves extend to the electrode tip part 21. In such example, the fluid ink 200 travels along the grooves, and a high sensitive ink-recording is obtainable.

Various features of configurations as described above can be put into practice by properly combining with each other.

As elucidated above, the apparatus of the present invention provides an ink recording head utilizing an electroosmotic phenomenon wherein the first electrodes are constituted so as to have an ink-philic property with respect to the fluid ink to be used, and also the surface of the substrate between the first electrodes for forming at least the concentrated fluid ink part is constituted to have an ink-repellent property substantially with respect to the above-mentioned fluid ink.

By giving the ink-repellent property to the surface of the substrate, a stable ink recording of high resolution can be realized, thereby the performance of an ink recording apparatus applying this recording head can be rapidly improved.

Therefore the present invention is exceedingly useful for the industry.

What is claimed is:

1. An ink recording apparatus comprising:
   a substrate,
   a predetermined number of first electrodes disposed on a surface of said substrate in insulated relation with respect to each other and with a predetermined pitch between each other corresponding to a pitch of picture elements to be recorded,
   an ink-philic porous sheet disposed on said substrate with said first electrodes inbetween,
   a fluid ink-permeable second electrode disposed on a surface of said porous sheet which surface is opposite to the surface contacting said first electrodes,
   a fluid ink feeding means for feeding said fluid ink to said ink-philic porous sheet,
   said first electrodes and said second electrode being supplied with a signal voltage therebetween, thereby to carry out electroosmotic travelling of said fluid ink through said porous sheet to tip parts of said first electrodes corresponding to said signal, characterized in that
   said first electrodes are of ink-philic conductive substance which are insulated and spatially separated from each other by a substantially ink-repellant and insulative substance provided at least at the tip parts of said first electrodes.

2. An ink recording apparatus in accordance with claim 1, wherein
   said ink repellent and insulative substance is a coating of an ink repellent material on the surface of said substrate.

3. An ink recording apparatus in accordance with claim 1, wherein
   said substrate is a plate of an ink repellent substance and surface thereof disposed between said first electrodes.

4. An ink recording apparatus in accordance with claim 1, wherein
said substrate is a laminated plate having an ink repellent layer at the surface contacting said porous sheet.

5. An ink recording apparatus in accordance with claim 4, wherein
said first electrodes are put on said ink repellent layer.

6. An ink recording apparatus in accordance with claim 4, wherein
said laminated layer having said predetermined number of grooves on the surface contacting said porous sheet, and
said first electrodes are installed in said grooves.

7. An ink recording apparatus in accordance with claim 1, wherein
said first electrodes are ink-philic metal strips embedded on a surface of an ink repellent dielectric substance bonded on a surface of a holding substrate, in a manner that said ink-philic metal strips are at least partly exposed from said ink-repellent dielectric substance on its face which contacts said first electrodes.

8. An ink recording apparatus in accordance with claim 7, wherein
each of said ink-philic metal strips have a ground and polished surface which is flush with a ground and polished surface of said ink repellent dielectric substance.

* * * * *